United States Patent Office 3,384,580
Patented May 21, 1968

3,384,580
GRAPHITE DISPERSIONS
James B. Peace, Modbury, Devon, England, assignor to Acheson Industries, Inc., Port Huron, Mich., a corporation of Michigan
No Drawing. Filed May 9, 1967, Ser. No. 637,038
10 Claims. (Cl. 252—29)

ABSTRACT OF THE DISCLOSURE

A stabilized dispersion composition for use as a lubricating oil or the like comprising graphite dispersed in a fluid or liquid organic carrier material, and containing a stablizing agent to maintain the graphite in dispersed form, said stabilizing agent being an ethylene-propylene copolymer or terpolymer; and the method of preparing said composition.

Background of the invention

This invention relates to stable dispersions of graphite particles in nonaqueous carrier fluids and stabilizers for use in preparing these stable dispersions.

By the term dispersion as used herein it is meant a system of minute solid particles relatively distinct from one another and generally suspended in a fluid or liquid medium. This dispersion may be either in highly liquid form, or in a concentrate or paste form.

For many years dispersions of graphite particles in oils have been prepared for various lubricating applications. Such dispersions have found utility, but there are many potentially interesting applications where agglomeration and separation of the graphite particles, due to instability in the carrier medium, have been pronounced. This has prevented practical use of such dispersions for these applications. This lack of stability or settling condition has been a constant and major problem at high operating temperatures. To improve the stability of these graphite-fluid dispersions, various stabilizing agents and processing methods have been suggested, however, none of those suggested have been completely satisfactory, and in fact, many have been deficient.

Typical of these previously known and unsatisfactory methods to produce stable graphite dispersions is that disclosed in U.S. Patent 1,732,221, where polyvalent metal soaps or metal salts of fatty acids are proposed as agents for stabilizing graphite particles in oils; and U.S. Patent 2,345,198, which proposes the use of aluminum soaps to stabilize graphite particles in oil. Since the issuance of these patents, work has been conducted by many groups and individuals on methods of stabilization using conventional surface active materials without satisfactory solutions to the stability problems.

Other inventors have proposed various processing methods to obtain stable graphite-hydrocarbon dispersions. Bartell, in U.S. Patent 2,176,879, proposes disintegration of graphite by intensive mixing with a low molecular weight polymerized butadiene as a disintegrating agent, in combination with a stabilizing agent such as lecithin or mineral sulfonate, to form a hydrocarbon dilutable, stable graphite dispersion.

Jacobson, in British Patent 795,957, proposes a similar processing method in an attempt to form stable graphite-hydrocarbon dispersions. Jacobson subjects the graphite particles to intensive milling on rolls with various polymerized hydrocarbon materials as disintegrating agents, and then removes the polymeric material, for example by distillation using volatile hydrocarbons. The graphite dispersion produced is substantially free from any stabilizing agent.

Objects

The object of the present invention is to provide an improved stabilized graphite dispersion composition, and the method of producing said composition.

Other objects, features and advantages of the present invention will become apparent from the subsequent description and the appended claims.

Summary of the invention

In contrast with prior practices for preparing graphite-hydrocarbon dispersions it has now been discovered that, by using the stabilizing agent of this invention, extemely stable graphite dispersions can be prepared without addition of the normally unsuitable surface active agents, and the complicated and intensive milling and extraction procedures unsatisfactorily employed heretofore.

The polymeric stabilizing agents of this invention, in contrast to the polymeric disintegrating agents of Jacobson British Patent 795,957, remain in the dispersion firmly attached to the graphite particles by surface forces, and form stabilized graphite particles which remain in suspension in the hydrocarbon carrier fluid for long periods of time even under severe flocculating conditions.

The new polymeric materials which have been found to be satisfactory for use as stabilizing agents are polymers of the polymethylene type with a saturated main carbon chain, with methyl groups substituted for hydrogen at an overall average substitution rate of about one methyl for every four carbon atoms in the chain, or polymers of the same type having, in addition to the methyl substitution, occasional substitution of unsaturated diene groups. The combined substitution of diene groups and methyl groups when both are present should still be such that the substitution rate on the main carbon chain averages about one substitution for every four carbon atoms.

Broadly described, the dispersion of this invention comprises: (a) graphite, present in an amount between about 0.001% and about 50% by weight of the composition, (b) a polymethylene polymer having a saturated main carbon chain, said polymer being selected from the group consisting of (1) copolymers of ethylene and propylene, said copolymers containing a methyl group substitution rate on the chain averaging about one methyl for every four carbon atoms in said chain, (2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and (3) mixtures of said copolymers and terpolymers, said polymethylene polymer being present in an amount between about 10% and about 100% by weight of the graphite present, said polymer having a viscosity of at least about 10 poises, (c) a fluid carrier material as the balance of the composition.

From a method aspect, broadly described, this invention comprises producing a stable dispersion composition comprising: (a) graphite, present in an amount between about 0.001% and about 50% by weight of the composition, (b) a polymethylene polymer having a saturated main carbon chain, said polymer being selected from the group consisting of (1) copolymers of ethylene and propylene, said copolymers containing a methyl group substitution rate on the chain averaging about one methyl for every four carbon atoms in said chain, (2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and (3) mixtures of said copolymers and terpolymers, said polymethylene polymer being present in an amount between about 10% and about 100% by weight of the graphite present, said polymer having a viscosity of at least about 10 poises, (c) a fluid carrier material as the balance of the composition, said method comprising the steps of: (A) mixing said graphite with said polymethylene polymer to form a mixture, and (B) diluting said mixture with said fluid carrier material.

*Description of preferred embodiments*

The specific polymeric materials for use as the stabilizing agent are the elastomeric compounds produced by the copolymerization of ethylene and propylene monomers, commonly known as ethylene-propylene copolymers. A preferred copolymer of this type would have approximately equimolecular proportions of the monomers. These copolymers may satisfactorily be prepared as disclosed in U.S. Patent No. 3,300,459.

Other useful polymeric materials of this type are the elastomeric compounds or terpolymers produced by the addition copolymerization of ethylene and propylene monomers with a minor proportion of an unconjugated diene, commonly called ethylene-propylene terpolymers, or ethylene-propylene-diene terpolymers.

Various unconjugated diene monomers have been used to produce these terpolymers, such as dicyclopentadiene, 1:4 hexanediene, methylene norbornene and the like. Of course, various other suitable unconjugated diene monomers would be apparent to those skilled in the art and the particular choice of said monomers is not critical.

Illustrative of terpolymers particularly useful in the practice of this invention are those formed by the polymerization of ethylene and propylene monomers and 1:4 hexanediene type unsaturated monomers. A preferred terpolymer of this type which has been found satisfactory contains approximately 53% (by weight) ethylene and has approximately 1%–5% unsaturation.

Alternatively, a polymeric material for the preparation of a stabilized graphite dispersion which has been found satisfactory is the product produced by the partial depolymerization of the ethylene-propylene copolymers and the ethylene-propylene terpolymers described above.

These partially depolymerized materials may be prepared using conventional techniques, for example, from the high molecular weight copolymers or terpolymers by heat treatment in inert atmosphere in a manner similar to that described in British Patent No. 1,001,455; or in reactive atmospheres (air or low oxygen content gas mixtures), or in the presence of catalysts to promote chain breaking or scission, with or without kneading of the heated polymeric mass.

The depolymerization should be conducted in such a fashion that the polymeric structure is not chemically altered other than by chain scission action to thereby produce a lower molecular weight (and lower viscosity) polymer of the same structure as the starting material. Depolymerization is carried out to an extent which produces a material of suitable viscosity. The resulting lower molecular weight polymers may be evaluated by viscosity measurements, and infrared examination to establish that the basic polymeric structure has not been altered.

It has been found that these partially depolymerized ethylenepropylene copolymers and partially depolymerized ethylene-propylene terpolymers, or mixtures thereof, are the most useful stabilizing agents because the lower viscosity materials can be more readily used, handled, and processed, and do not impart undesirably high viscosity to the end products.

The viscosities for the most useful stabilizing agents range in value from about 1 to about 500 kilopoises on a preferred basis. Broadly stated, the viscosity may range from about 10 poises minimum to an upper level limited only by ability to mix the polymer conveniently in rubber processing equipment, that is, approximately 100 Mooney viscosity ML (1+4) at 100° C. By this, it is meant a viscosity of 100 Mooney determined at 100° C., large rotor, heating time one minute, with the reading taken after four minutes.

The amount of stabilizing agent required to produce satisfactory dispersions varies with the size of the graphite particles to be dispersed and the character of the dispersion medium. In general, it has been found that satisfactory dispersions can be produced with a ratio of stabilizing agent to graphite particles as low as about 10% by weight. Suitable dispersions have also been produced using ratios of about 100%, by weight. Such high ratios are not essential for most graphite or oils, and satisfactory dispersions can be made at lower levels with the added advantages of reduced material costs and easier processing conditions. The preferred ratios of stabilizer to graphite are about 15% to about 75% by weight.

The graphite particles which can be used to form stable dispersions in fluid oil carriers by this invention can be either natural graphites or electric furnace graphites. The type used is not a critical factor in the operation of this invention; but, rather, it is dictated by the desired end use of the graphited dispersion. By way of illustration, lubricating properties appear to be greatest when high purity (99+%) electric furnace graphite is used with conventional lubricating oils.

The size of the graphite particles should be generally finer than No. 100 U.S. Standard Sieve (that is, 149 microns). Graphite particles below about 75 microns are most effective for lubrication purposes, and if extreme freedom from settling is important, the particle size should be about 1 micron and below. Although the polymeric materials of this invention are useful primarily as stabilizing agents, during the mixing process limited disintegration of the graphite particles and particularly aggregates of graphite particles may occur under rigorous mixing conditions.

The preferred method of forming stable dispersions in accordance with this invention utilizes processing techniques which give high content dispersions, generally at 10%–50% (by weight) graphite in a fluid or liquid carrier material, but this may be varied over a wide range. The carrier is a substantially organic material, normally petroleum oil, but other carriers have been found to be satisfactory, including vegetable oils, such as rapeseed oil, liquid hydrocarbons, such as, aliphatic petroleum naphthas and aromatic petroleum naphthas, and the like. These high content dispersions, or concentrates, are normally diluted with additional amounts of fluid to reach graphite content levels of about 0.001% to about 15%, for most uses. The diluent carrier can be the same material used as the concentrate carrier, or miscible materials such as other petroleum oils or oil blends, greases, other liquid hydrocarbons, and the like.

Those skilled in the art will realize that the particular carrier or carriers used may vary widely and the choice thereof is not critical.

Various test methods have been proposed to evaluate the stability properties of graphite-oil dispersions, such as long-term storage tests (for various times and under various storage conditions), long-term use tests, etc. It has been found that useful comparative results can be obtained in the laboratory in reasonable periods of time by means of two standardized elevated temperature tests, which are detailed below.

*Hot oil stability test*

The graphite-oil dispersion is diluted with a series of reference oils to a uniform content of approximately 0.1 percent by weight. The diluted dispersion is heated and maintained in an open, substantially full, 1¼ ounce glass jar at a temperature of 160°±2° C. for 20 hours. At the end of this period, the dispersion is examined visually at 160° C., and microscopically at room temperature to determine its stability at extreme temperature.

To make the visual examination, a metal spatula is dipped one inch into the hot material and withdrawn, without agitating or unduly disturbing the sample. The oil film on the spatula blade is observed. If the film is black and opaque, the sample is allowed to cool and examined further by microscope, avoiding agitation or shear as far as possible. If no aggregates, or aggregates of a very few particles are found, the material is rated as acceptable, but the presence of chains of flocculated particles indicates unsatisfactory stability. The stability may be judged as unsatisfactory based only on the spatula observation if the oil film is clear, indicating flocculation and settling of substantially all the particles.

*Simulated life tests*

The graphite-oil dispersion is diluted with a series of reference oils to a uniform content of approximately 0.1 percent by weight graphite. One percent water is added to the diluted dispersion and it is heated and maintained at a temperature of 120° C.±1° C., and examined daily.

This daily examination is performed using a spatula in the manner described in the "Hot Oil Stability" tests. The time in days at which failure, as indicated by a clear oil film, occurs is recorded as the "life" in days. This test gives an indication of the useful life of graphited oil at maximum normal working temperatures in internal combustion engines.

The reference oils used as diluents in these tests have a pronounced effect on the results obtained. In the full evaluation tests of stabilizers culminating in this invention, more than 30 commercially available refinery oils and proprietary internal combustion engine crankcase oils were used as the diluting oils for these elevated temperature tests. In this specification, however, we report only the results obtained with three oils illustrative of three flocculating ability levels:

Oil "A"—a solvent refined neutral hydrocarbon oil with normal flocculating properties. (500 SSU at 100° F.)

Oil "B"—a medium duty, medium additive level, proprietary (premium grade) internal combustion engine crankcase oil with high flocculating properties.

Oil "C"—a medium duty, medium additive content, proprietary (premium grade) internal combustion engine crankcase oil with extremely strong flocculating properties.

The test results reported in this specification are based upon tests using these three oils, and give an evaluation of the superior stabilizing ability of the stabilizers of this invention under various conditions of use. The results obtained from evaluation tests with the other oils gave comparable results.

EXAMPLE I

One hundred parts of electric furnace graphite (99+% graphitic carbon content, surface area of 150 square meters per gram) was placed in a double arm internal mixer with 100 parts of a partially depolymerized ethylene-propylene copolymer (viscosity of 50 kilopoises). This copolymer had an ethylene:proplyene ratio of approximately 1:1, and a starting viscosity before being depolymerized of 100,000+kilopoises. The combination, which had the consistency of a stiff paste, was mixed for 6 hours. At the end of this time 80 parts of a solvent neutral petroleum oil (500 SSU at 100° F.) were added to the mixture in small increments, mixing between the additions, and further mixing 15 minutes at the end of the addition period to insure uniformity of the dispersion. The dispersion removed from the mixer was in the form of a viscous fluid, which was evaluated by diluting this concentrated dispersion with the reference oils and subjecting these dilutions to the "hot oil stability test" and the "simulated life test." The satisfactory results of these tests are included in Table I.

EXAMPLE II

A concentrated dispersion of graphite in oil was prepared as in Example I, except that the amount of partially depolymerized ethylene-propylene copolymer was reduced to 57 parts. The other ingredients and processing conditions were the same.

The satisfactory test results obtained from this dispersion are reported in Table I.

EXAMPLE III

Another dispersion was prepared in equipment and in a manner similar to Example I except that the electric-furnace graphite had a larger particle size (surface area of 95 square meters per gram) and the partially depolymerized ethylene-propylene copolymer had a viscosity of 9 kilopoises and only 40 parts was used, and 20 parts petroleum oil was added to the mixer initially at the same time as the copolymer. After the 6-hour milling period, additional oil was added as in Example I. The superior results obtained are reported in Table I.

EXAMPLE IV

Another dispersion was prepared as in Example III except that the stabilizing agent used was 30 parts of ethylene-propylene terpolymer (viscosity of over 100,000 kilopoises), containing approximately 53% ethylene, 2–3% unsaturation from the diene monomer, which was of the 1:4 hexanediene type, commercially designated as "Nordel 1040," and 30 parts of the petroleum oil was added to the mixer at the same time as the terpolymer. Nordel 1040 has a specific gravity of 0.85, a refractive index of 1.481–1.484, and a coefficient of linear expansion of about $2.3 \times 10^{-4}$ (° C.)$^{-1}$.

The satisfactory results obtained with this dispersion are reported in Table I.

EXAMPLE V

A dispersion was prepared as Example IV except that the polymeric stabilizer used was 30 parts of ethylene-propylene copolymer (viscosity greater than 100,000 kilopoises). The copolymer had an ethylene:propylene ratio of approximately 1:1 and is the source material used to produce the partially depolymerized copolymer used in Example I.

The satisfactory results obtained with this dispersion are reported in Table I.

EXAMPLE VI

A dispersion was prepared as in Example III except that 40 parts of partially depolymerized ethylene-propylene copolymer (viscosity of 45 kilopoises) was used and the oil used was a blend of solvent neutral petroleum oils (approximately 50% of a 150 SSU at 100° F. oil and 50% of a 500 SSU at 100° F. oil). The dispersion obtained was evaluated and the results are shown in Table I.

EXAMPLE VII

A dispersion was prepared as in Example III except that the partially depolymerized ethylene-propylene copolymer had a viscosity of 55 kilopoises and 40 parts were used.

The superior results obtained with this dispersion are incorporated in Table I.

Similar satisfactory dispersions were prepared using natural flake graphites and also using rapeseed oil, aliphatic petroleum naphthas, aromatic petroleum naphthas, and polypropylene glycol oil.

TABLE I

|  | Oil "A" | | Oil "B" | | Oil "C" | |
| --- | --- | --- | --- | --- | --- | --- |
|  | Hot oil stability | Simulated life, days to failure | Hot oil stability | Simulated life, days to failure | Hot oil stability | Simulated life, days to failure |
| The best commercially available graphite-oil dispersion. | Failed | 10 | Failed | 28 | Failed | 3 |
| Example I | Good | Over 28 | Good | Over 28 | do | 7 |
| Example II | do | do | do | do | do | 9 |
| Example III | do | do | do | do | Fair | 7 |
| Example IV | Fair | 28 | do | do | Failed | 10 |
| Example V | do | Over 28 | do | do | do | 11 |
| Example VI | Good | 28 | do | 28 | Fair | 11 |
| Example VII | do | Over 28 | do | Over 28 | Good | 10 |

This table of results shows the superior stability of the dispersions prepared in accordance with this invention as compared to the best commercially available oil-graphite dispersion previously known to us. This superiority is shown by the consistent significant increase in life observed in the "Simulated Life Test." In most oils the "Hot Oil Stability" is also significantly improved following this invention. This test is particularly stringent in Oil "C," and it has been difficult, if not impossible, before this invention, for any graphite-oil dispersion to pass the test in this oil. The superior results obtained by this invention are indicated by the successful formulation of a number of dispersions which resist even these extreme conditions.

EXAMPLE VIII

A suitable dispersion could also be prepared as in Example IV, except that the terpolymer used would be an ethylene-propylene-diene terpolymer (commercially designated Royalene 301) having the following approximate properties:

Mooney viscosity (ML-4 at 212° F.) _____ 60
Specific gravity _____ 0.865
Volatile matter (percent max.) _____ 1.0
Iodine number _____ 10

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A dispersion composition comprising
 (a) graphite, present in an amount between about 0.001% and about 50% by weight of the composition,
 (b) a polymethylene polymer having a saturated main carbon chain, said polymer being selected from the group consisting of
  (1) copolymers of ethylene and propylene, said copolymers containing a methyl group substitution rate on the chain averaging about one methyl for every four carbon atoms in said chain,
  (2) terpolymers of ethylene, propylene and an unconjugated diene monomer, said terpolymers containing substituted groups on the chain averaging about one group for every four carbon atoms in said chain, said groups being selected from the class consisting of said diene and methyl groups, and
  (3) mixtures of said copolymers and terpolymers, said polymethylene polymer being present in an amount between about 10% and about 100% by weight of the graphite present, said polymer having a viscosity of at least about 10 poises,
 (c) a fluid carrier material as the balance of the composition.

2. The composition of claim 1 wherein said graphite has a particle size finer than about 149 microns.
3. The composition of claim 1 wherein said graphite has a particle size finer than about 75 microns.
4. The composition of claim 1 wherein said viscosity has a value between about 1 and about 500 kilopoises.
5. The composition of claim 1 wherein said graphite is present in an amount between about 0.001% and about 15% by weight.
6. The composition of claim 1 wherein said polymer is present in an amount between about 15% and about 75% of the graphite present.
7. The composition of claim 1 wherein said graphite has a particle size finer than about 149 microns, and said viscosity has a value between about 1 and about 500 kilopoises.
8. The composition of claim 7 wherein said graphite is present in an amount between about 0.001% and about 15% by weight.
9. The composition of claim 8 wherein said polymer is present in an amount between about 15% and about 75% of the graphite present.
10. The composition of claim 1 wherein said polymer is selected from the group consisting of a copolymer containing approximately equimolar proportions of ethylene and propylene, and a terpolymer of ethylene, propylene, and 1,4-hexanediene, said terpolymer containing about 53% by weight ethylene and having approximately 1% to 5% unsaturation.

References Cited

UNITED STATES PATENTS 3,300,459  1/1967  Natta et al. _____ 260—88.2

FOREIGN PATENTS 795,957  6/1958  Great Britain.

DANIEL E. WYMAN, Primary Examiner.

I. VAUGHN, Assistant Examiner.